(12) United States Patent
Happy et al.

(10) Patent No.: US 10,173,576 B2
(45) Date of Patent: Jan. 8, 2019

(54) VEHICLE LIGHTING STRUCTURE

(71) Applicant: Nissan North America, Inc., Franklin, TN (US)

(72) Inventors: Kyle Happy, Walled Lake, MI (US); Thomas Cho, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 154 days.

(21) Appl. No.: 15/252,416

(22) Filed: Aug. 31, 2016

(65) Prior Publication Data

US 2018/0056855 A1 Mar. 1, 2018

(51) Int. Cl.
*B60Q 1/30* (2006.01)
*B60Q 1/00* (2006.01)

(52) U.S. Cl.
CPC ......... *B60Q 1/0035* (2013.01); *B60Q 1/0041* (2013.01); *B60Q 1/30* (2013.01)

(58) Field of Classification Search
CPC ...... B60Q 1/44; B60Q 1/2661; B60Q 1/2696; B60Q 1/30; B60Q 1/0035; B60Q 1/0041
See application file for complete search history.

(56) References Cited

U.S. PATENT DOCUMENTS

2010/0244697 A1* 9/2010 Illium ................. B60J 5/101
　　　　　　　　　　　　　　　　　　　　　　315/77
2016/0208995 A1* 7/2016 Yoshino ............... F21S 43/14

* cited by examiner

*Primary Examiner* — Anh T Mai
*Assistant Examiner* — Nathaniel J Lee
(74) *Attorney, Agent, or Firm* — Global IP Counselors, LLP

(57) ABSTRACT

A first lamp assembly has a first attachment surface, a first transparent surface, a first side surface extending from the first transparent surface to the first attachment surface, and a first lighting member positioned to emit light through a portion of the first side surface. A second lamp assembly has a second attachment surface, a second transparent surface opposite the second attachment surface and a second side surface extending from the second transparent surface to the second attachment surface. The second side surface has a first projection extending therefrom that defines a first light deflecting surface such that when the second side surface and the first side surface are adjacent to one another with the light deflecting surface and first lighting member being aligned, the first light deflecting surface reflects and disperses light in a first area between the first lamp assembly and the second lamp assembly.

20 Claims, 6 Drawing Sheets

VEHICLE LIGHTING STRUCTURE

BACKGROUND

Field of the Invention

The present invention generally relates to a vehicle lighting structure. More specifically, the present invention relates to a vehicle lighting structure having a first lamp assembly and a second lamp assembly movable relative to one another, the second lamp assembly having a surface that directs light emitted from the first lamp assembly to illuminate a portion of a gap defined between the first and second lamp assemblies.

Background Information

Most vehicles typically include various lamp assemblies for illuminating exterior areas about the vehicle. For example, most vehicles have a pair of vehicle headlamp assemblies in the front of the vehicle and a pair of vehicle tail light assemblies in the rear of the vehicle. Vehicle lamp assemblies typically function as parking lamps, daytime running lamps, fog lights, off-road utility lights as well as various other signaling devices. In the case of vehicle tail light assemblies, it has also been increasingly popular to mount the vehicle tail light assemblies onto a movable panel of a vehicle, such as a trunk lid or a rear door.

SUMMARY

One object of the present disclosure is to provide a first lamp assembly with a lighting device and a second lamp assembly that includes a light deflecting surface. The first lamp assembly is spaced apart from the second lamp assembly. When the lighting device emits light aimed at the light deflecting surface, the light deflecting member deflects the light received to an area between the first and second lamp assemblies.

In view of the state of the known technology, one aspect of the present disclosure is to provide a vehicle lighting structure with a first lamp assembly and a second lamp assembly. The first lamp assembly has a first attachment surface, a first transparent surface opposite the first attachment surface, a first side surface extending from the first transparent surface to the first attachment surface, and a first lighting member positioned to emit light through a portion of the first side surface. The second lamp assembly has a second attachment surface, a second transparent surface opposite the second attachment surface and a second side surface extending from the second transparent surface to the second attachment surface. The second side surface has a first projection extending therefrom that defines a first light deflecting surface such that when the second side surface and the first side surface are adjacent to one another with the light deflecting surface and first lighting member being aligned, and with the first lighting member providing light, the first light deflecting surface reflects and disperses light in a first area between the first lamp assembly and the second lamp assembly.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
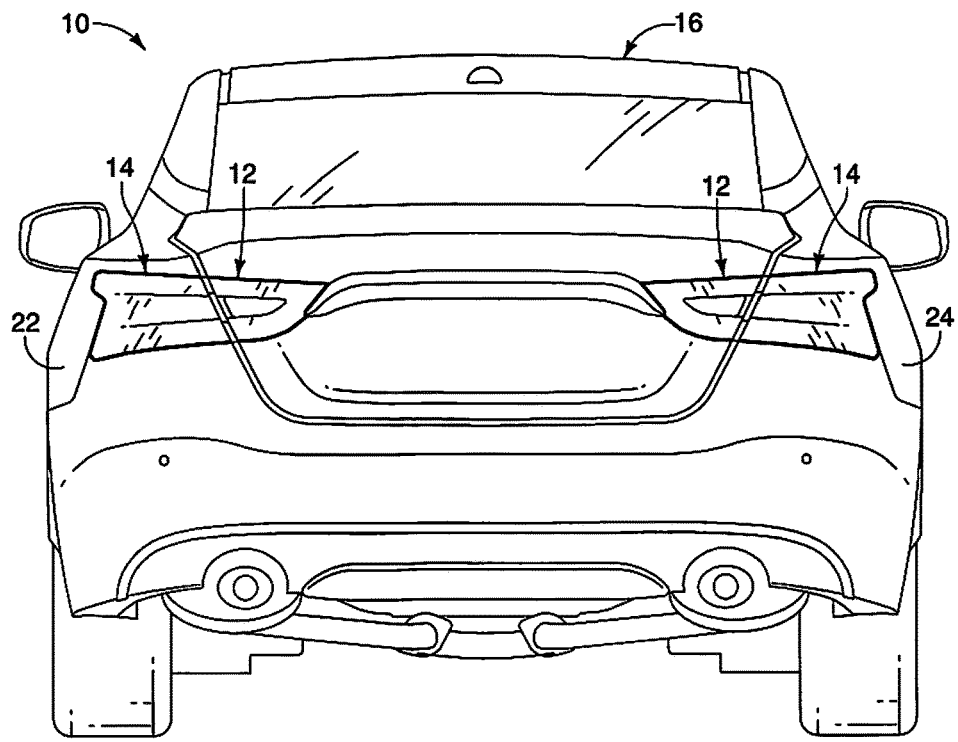
FIG. 1 is a rear view of a vehicle body structure showing an opening and a closure member covering the opening, with a first lamp assembly attached to the closure member, and a second lamp assembly attached to the vehicle body structure adjacent to the opening with the first and second lamp assemblies being aligned with the closure member being in a closed position in accordance with the first embodiment.
Figure 2:
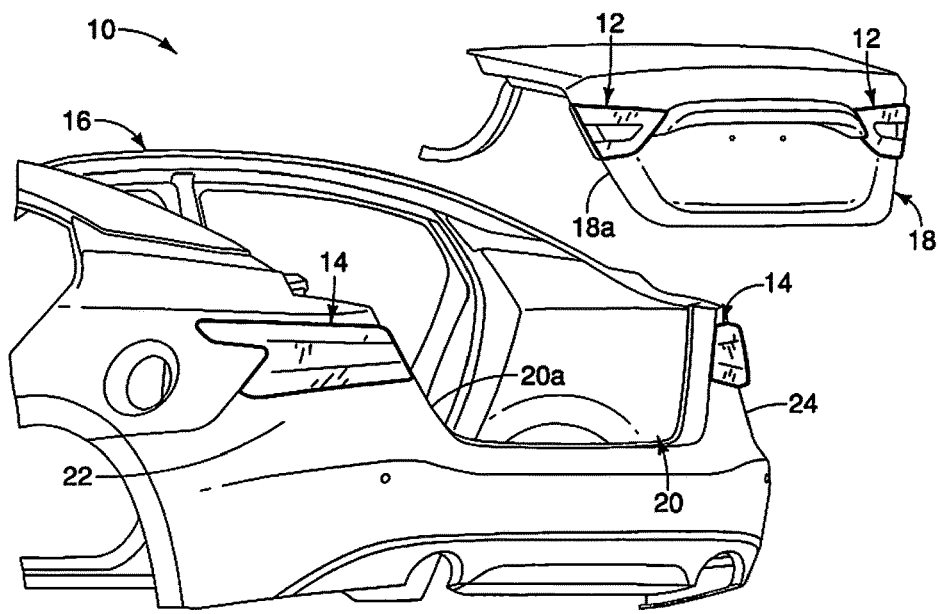
FIG. 2 is an exploded perspective view of the vehicle body structure depicted in FIG. 1, showing the opening, the closure member, the first lamp assembly and the second lamp assembly in accordance with the first embodiment.
Figure 3:
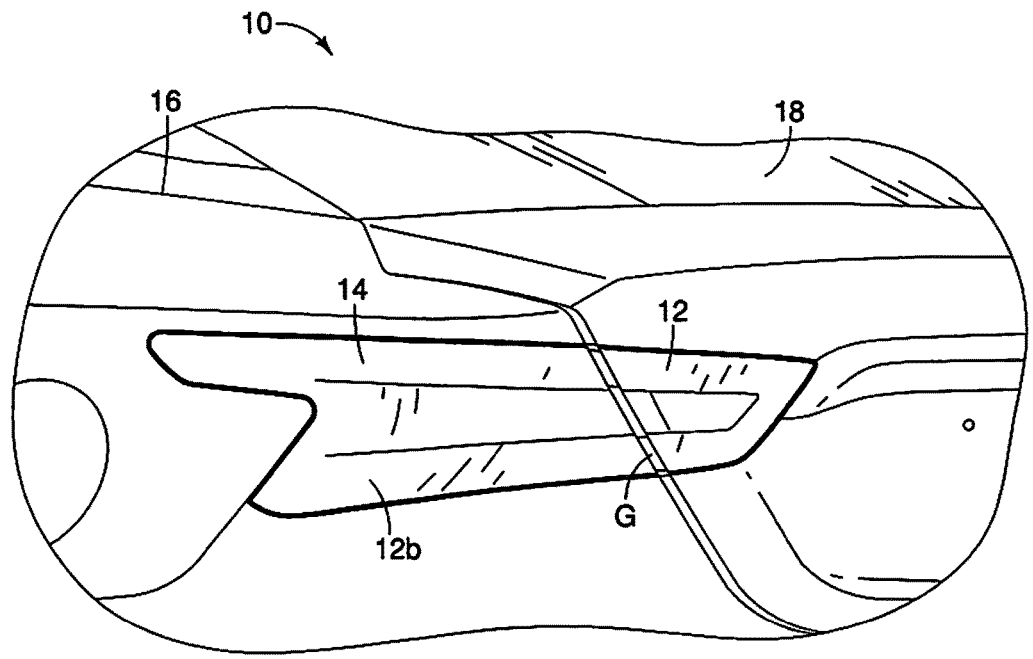
FIG. 3 is a perspective view of a rear portion of the vehicle body structure showing the first lamp assembly and the second lamp assembly aligned with one another with the closure member in the closed position in accordance with the first embodiment.
Figure 4:
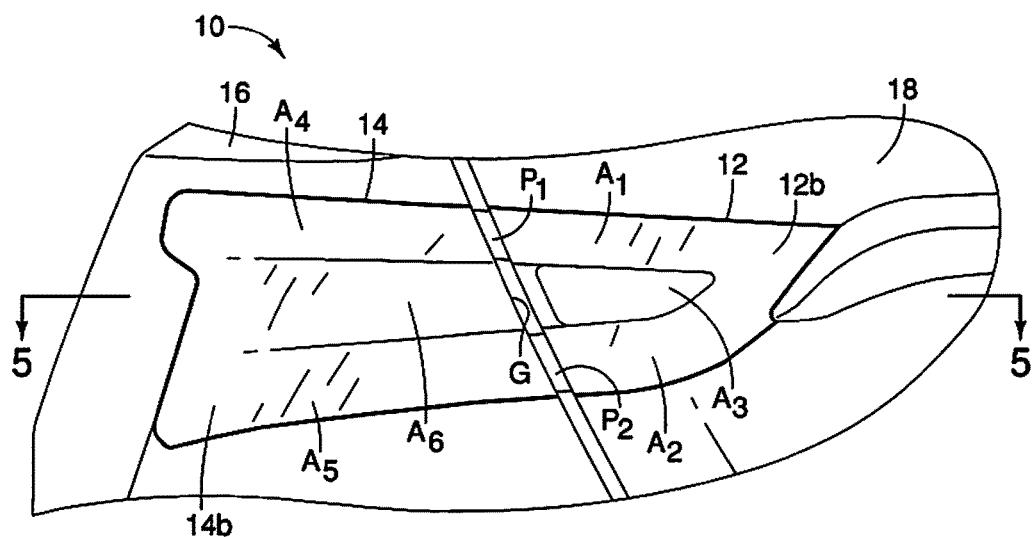
FIG. 4 is a rear view of the rear portion of the vehicle body structure showing the first lamp assembly and the second lamp assembly aligned with one another with the closure member in the closed position such that a gap is defined between the first lamp assembly and the second lamp assembly in accordance with the first embodiment.

Referring initially to FIGS. 1 and 2, a vehicle 10 is illustrated that has a vehicle lighting structure that includes a first lamp assembly 12 and a second lamp assembly 14. In the depicted embodiments, when the first and second lamp assemblies 12 and 14 are adjacent to one another, combined they have the appearance of being a single structure, as shown in FIGS. 3 and 4. However, as is described in greater detail below, the first lamp assembly 12 and the second lamp assembly 14 are separate structures that are movable relative to one another.

In the depicted embodiment, the first lamp assembly 12 and the second lamp assembly 14 are shown with specific contours and shapes. However, it should be understood from the drawings and the description herein that the depicted overall design and shapes of the first lamp assembly 12 and the second lamp assembly 14 are merely one example of such structures and that the disclosure is not limited to the depicted design. In other words, the first lamp assembly 12 and the second lamp assembly 14 can have differing shapes and contours and still fall within the scope of the accompanying claims.

The vehicle 10 has a vehicle body structure 16 that includes two pairs of the first lamp assembly 12 and the second lamp assembly 14, one pair being installed at a left rear corner 22 of the vehicle body structure 16 and the other provided at a right rear corner 24 of the vehicle body structure 16. The two pairs of the first lamp assembly 12 and the second lamp assembly 14 are functionally and structurally identical except that they are mirror images of one another (symmetrical about a longitudinal center line of the vehicle 10). Since the two pairs of the first lamp assembly 12 and the second lamp assembly 14 are basically the same, description of only one pair of the first lamp assembly 12 and the second lamp assembly 14 is provided below for the sake of brevity, but applies equally to both pairs.

The vehicle body structure 16 is a conventional structure that is configured to accommodate the first and second lamp assemblies 12 and 14. While the vehicle 10 is illustrated as a sedan, it will be apparent to those skilled in the art from this disclosure that the first and second lamp assemblies 12 and 14 can be configured to be used with other vehicle body styles. In the illustrated embodiment of the vehicle 10, the vehicle body structure 16 is made of one or more body panels to form a unibody construction. Alternatively, the vehicle body structure 16 can be a body that is mounted on a frame.

As shown in FIG. 2, the vehicle body structure 16 has at least one stationary body panel that at least partially defines an access opening 20, which is an opening that accesses a trunk of the vehicle 10. A movable body panel 18 (a closure member) is movably mounted on the vehicle body structure 16 between a closed position (FIG. 1) and an open position.

The movable body panel 18 is a trunk lid that is hinged to the vehicle body structure 16 to selectively close and open the access opening 20 in a conventional manner. In the illustrated embodiment, the movable body panel 18 has a peripheral edge 18a that aligns with a peripheral edge 20a of the access opening 20 for the vehicle 10. One of the first and second lamp assemblies 12 and 14 is mounted on the vehicle body structure 16 and the other of the first lamp assembly 12 and the second lamp assembly 14 is mounted on the movable body panel 18.

In the depicted embodiment, the first tail lamp assembly 12 is mounted on the movable body panel 18 with one edge being adjacent to the peripheral edge 18a of the movable body panel 18, and the second lamp assembly 14 is mounted to a stationary fender section of the vehicle body structure 16 with one edge thereof being adjacent to a peripheral edge 20a of the access opening.

As is described in greater detail below, when the movable body panel 18 is in the closed position (FIGS. 1, 3 and 4), the first and second lamp assemblies 12 and 14 are aligned with one another in a manner described in greater detail below. However, it should be understood from the drawings and the description herein that alternatively the first lamp assembly 12 can be mounted to the stationary fender section of the vehicle body structure 16 and the second lamp assembly 14 can be mounted to the movable body panel 18.

Figure 5:
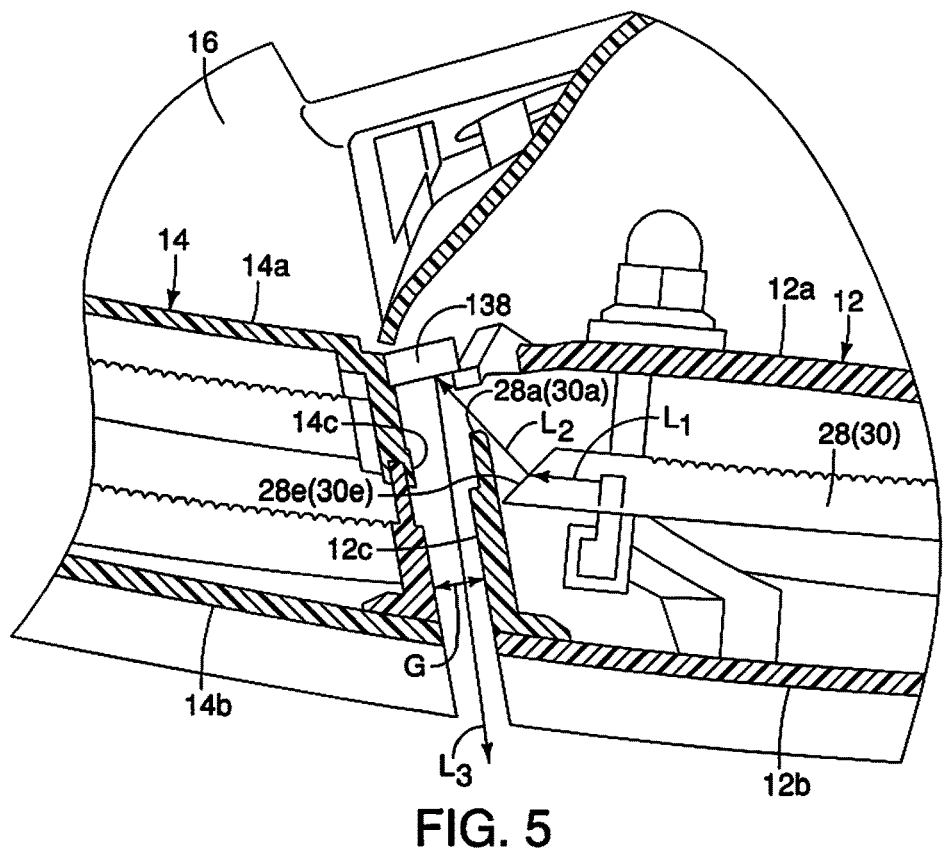
FIG. 5 is a cross-section schematic view of the vehicle lighting structure taken along the line 5-5 in FIG. 4, showing a first lighting member of the first lamp assembly emitting light through a light passage of the first lamp assembly on to a light deflecting surface of the second lamp assembly in order illuminate a portion of the gap defined between the first lamp assembly and the second lamp assembly in accordance with the first embodiment.

As shown in FIG. 5, the first and second lamp assemblies 12 and 14 define a gap G therebetween with the closure member 18 in the closed position. As indicated in FIG. 4, the first and second lamp assemblies 12 and 14 are further configured such that a first portion $P_1$ and a second portion $P_2$ of the gap G is illuminated to provide the appearance of continuous lighting from the first lamp assembly 12, within the gap G and to the second lamp assembly 14, as is described in greater detail below.

Figure 6:
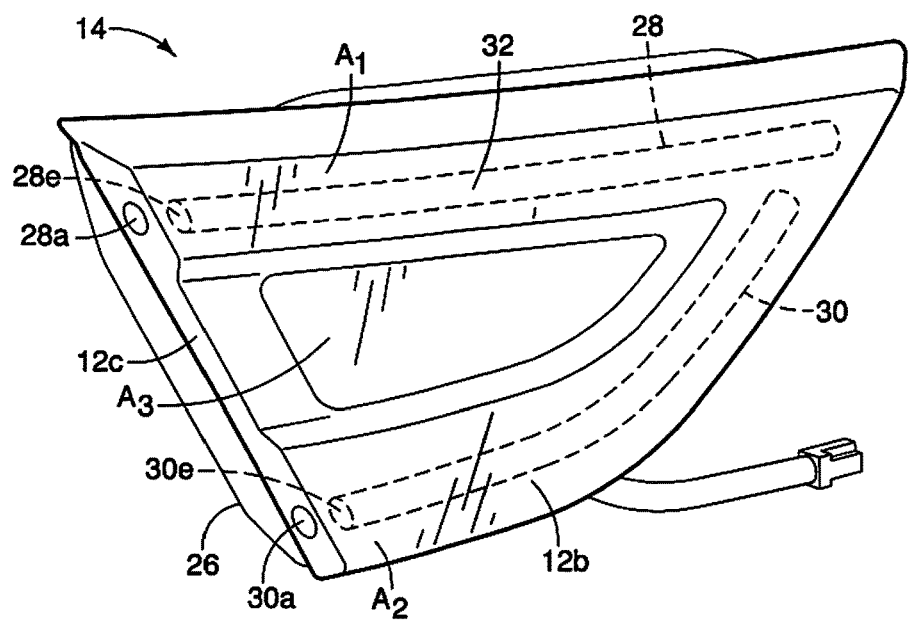
FIG. 6 is a perspective view of the first lamp assembly removed from the vehicle body structure showing a transparent surface, a first lighting member (in phantom), a second lighting member (in phantom) and a side surface that includes a first light passage and a second light passage in accordance with the first embodiment.
Figure 7:
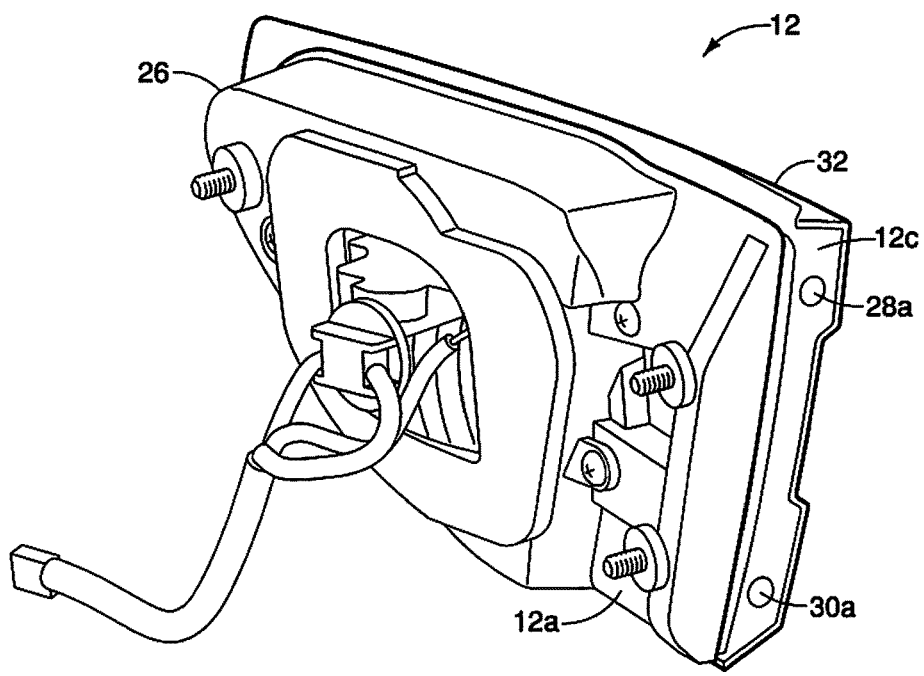
FIG. 7 is another perspective view of the first lamp assembly showing an attachment surface, the first light passage and the second light passage in accordance with the first embodiment.

Referring now to FIGS. 6 and 7, the first lamp assembly 12 basically includes a lamp housing 26, a first lighting member 28, a second lighting member 30 and a transparent lens cover 32. The overall shapes and configurations of lamp housing 26 and the transparent lens cover 32 depend on the overall design of the vehicle 10. In other words, the lamp housing 26 and the transparent lens cover 32 are configured to complement the shapes and overall designs of the vehicle 10 and are not limited to the general shapes and contours depicted in the drawings.

The first lamp assembly 12 also includes an attachment surface 12a defined along the lamp housing 26, as shown in FIGS. 5 and 7, a transparent surface 12b defined along the transparent lens cover 32 as shown in FIGS. 4 and 6, and a side surface 12c as shown in FIGS. 5, 6 and 7.

The attachment surface 12a includes attachment structures (such as mechanical fastening elements) that facilitate attachment to the movable body panel 18 (the closure member) of the vehicle body structure 16 in a conventional manner. The transparent surface 12b and corresponding portions of the transparent lens cover 32 are such that light emitted from the first lighting member 28 and the second lighting member 30 passes through the transparent lens cover 32 with specific areas of the transparent surface 12b being illuminated. For example, in the depicted embodiment, with the first and second lighting members 28 and 30 of the first lamp assembly 12 emitting light, the corresponding areas $A_1$ and $A_2$ of the transparent surface 12b have light passing therethrough. An area $A_3$ of the transparent surface 12b (below the area $A_1$ and above the area $A_2$) would not necessarily be illuminated. Rather, it should be understood from the drawings and the description herein that the area $A_3$ can be illuminated by another lighting member (not shown) such that the area $A_3$ is illuminated when, for example, the vehicle 10 is backing up (in reverse), or alternatively, the area $A_3$ can be a turn signal indicator portion, depending upon the overall design of the vehicle 10.

The side surface 12c of the first lamp assembly 12 includes a first light passage 28a and a second light passage 30a, as shown in FIGS. 5, 6 and 7, and described in greater detail below.

Each of the first lighting member 28 and the second lighting member 30 can include any of a variety of lighting devices and device configurations. For example, the first lighting member 28 and the second lighting member 30 can be light pipes that emit light along their length when illuminated from one end thereof by, for example, an LED (light emitting diode). Since light pipes and LEDs are conventional lighting members, further description is omitted for the sake of brevity. Alternatively, each of the first lighting member 28 and the second lighting member 30 can include conventional lighting elements such as a series of small incandescent bulbs, or a linear series of LEDs. Further, the first lighting member 28 and the second lighting member 30 can alternatively be reflective elements, such as parabolic mirrors, or other similar constructs that receive light from a remote lighting element or elements and reflect, radiate, disperse or otherwise emit that light outward and away from itself through the first and second areas $A_1$ and $A_2$ of the transparent surface 12b.

The first light passage 28a and the second light passage 30a can take any of a variety of forms. For example, each of the first and second light passages 28a and 30a can be a transparent portion of the side surface 12c or can be a lens molded with or into the lamp housing 26 and/or the transparent lens covers 32 or inserted into an aperture formed in the transparent lens cover 32. The first light passage 28a is aligned with an end 28e of the first lighting member 28, and the second light passage 30a is aligned with and end 30e of the second lighting member 30 such that light from each of the first lighting member 28 and the second lighting member 30 is directed through a corresponding one of the first light passage 28 and second light passage 30, as indicated in FIG. 5, and described further below.

Figure 8:
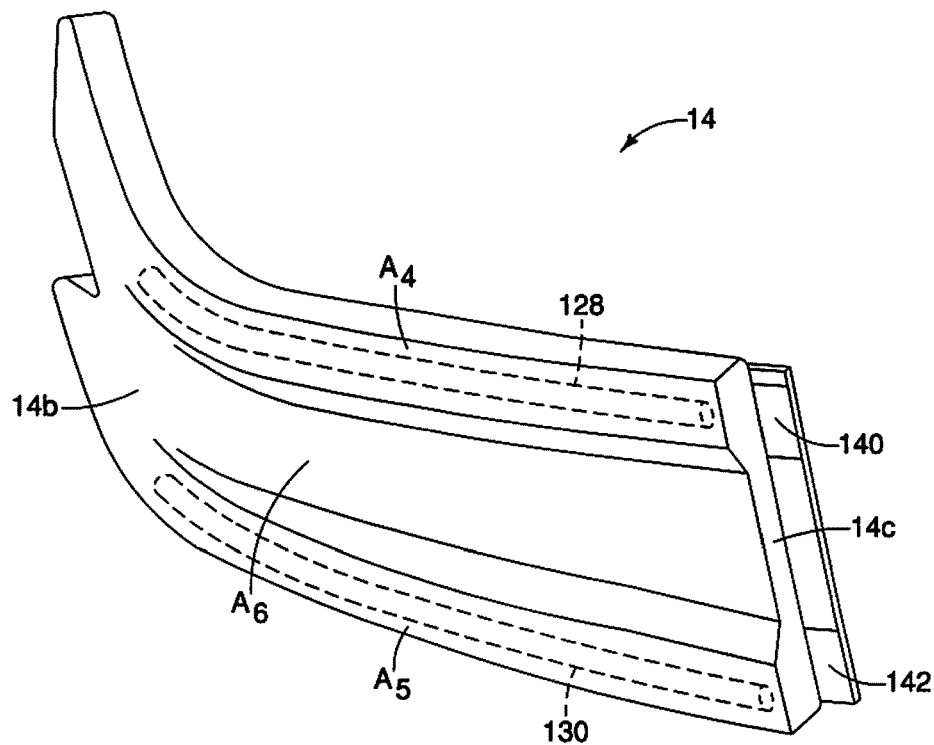
FIG. 8 is a perspective view of the second lamp assembly removed from the vehicle body structure showing a transparent surface, a third lighting member (in phantom), a fourth lighting member (in phantom), a side surface and a projection that includes a first light deflecting surface and a second light deflecting surface in accordance with the first embodiment.
Figure 9:
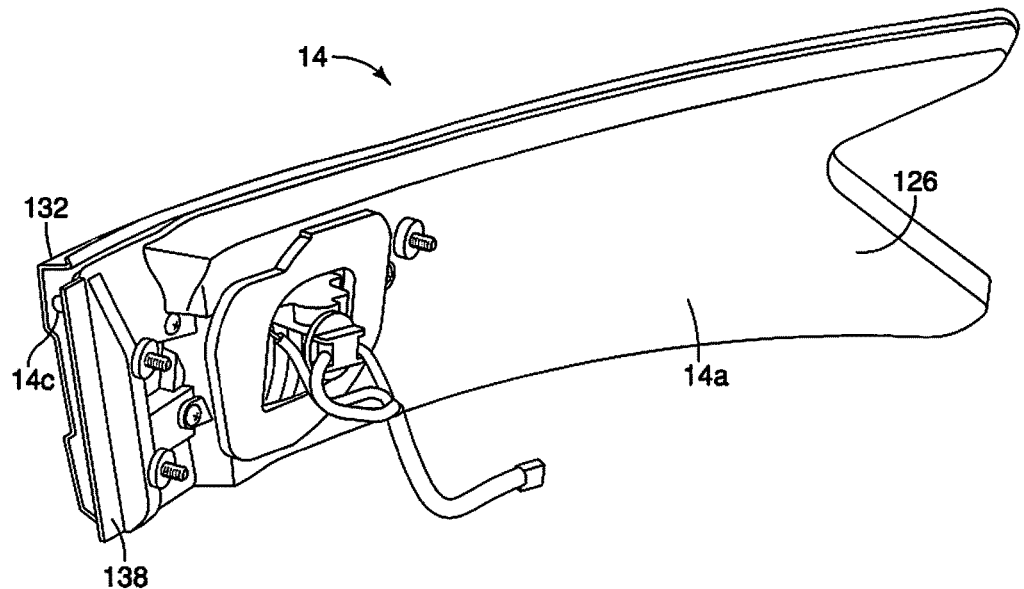
FIG. 9 is another perspective view of the second lamp assembly showing an attachment surface, and the projection in accordance with the first embodiment.

Referring now to FIGS. 8 and 9, a description of the second lamp assembly 14 is now provided. The second lamp assembly 14 basically includes a lamp housing 126, a first lighting member 128, a second lighting member 130 and a transparent lens cover 132. The overall shapes and configurations of lamp housing 126 and the transparent lens cover 132 depend on the overall design of the vehicle 10. In other words, the lamp housing 126 and the transparent lens cover 132 are configured to complement the shapes and overall designs of the vehicle 10 and are not limited to the general shapes and contours depicted in the drawings.

The second lamp assembly 14 also includes an attachment surface 14a defined along the lamp housing 126, as shown in FIGS. 5 and 9, a transparent surface 14b defined along the transparent lens cover 132 as shown in FIGS. 4 and 8, and a side surface 14c as shown in FIGS. 5, 8 and 9.

The attachment surface 14a includes attachment structures (such as mechanical fastening elements) that facilitate attachment to the vehicle body structure 16 in a conventional manner.

The transparent surface 14b and corresponding portions of the transparent lens cover 132 are such that light emitted from the first lighting member 128 and the second lighting member 130 passes through the transparent lens cover 132 with specific areas of the transparent surface 14b being illuminated. For example, in the depicted embodiment, with the first and second lighting members 128 and 130 of the second lamp assembly 14 emitting light, the corresponding areas $A_4$ and $A_5$ of the transparent surface 14b have light passing therethrough. An area $A_6$ of the transparent surface 14b (below the area $A_4$ and above the area $A_5$) would not necessarily be illuminated. Rather, it should be understood from the drawings and the description herein that the area $A_6$ can be illuminated by another lighting member (not shown) such that the area $A_6$ is illuminated when, for example, the vehicle 10 is backing up (in reverse), or alternatively, the area $A_6$ can be a turn signal indicator portion, depending upon the overall design of the vehicle 10.

The side surface 14c of the second lamp assembly 14 includes a projection 138 that can be in the form of a flat projection, or can be a plurality of separate projections. In the depicted embodiment, the projection 138 includes a first light deflecting surface 140 and a second light deflecting surface 142.

Each of the first light deflecting surface 140 the second light deflecting surface 142 is a surface that at least partially reflects light shined thereon. The first and second light deflecting surfaces 140 and 142 can be smooth and mirror-like with a reflective finish, but can also include ridges or contoured surface portions arranged to at least partially diffuse reflected light. In other words, the first and second light deflecting surfaces 140 and 142 can be attenuated by the condition of their respective surfaces to ensure that only the first and second portions $P_1$ and $P_2$ in FIG. 4 are provide with illumination.

Consequently, the first light deflecting surface 140 is positioned such that light reflecting or deflecting off of the first light deflecting surface 140 is primarily emitted in the first portion $P_1$ of the gap G, as shown in FIG. 4. Similarly, the second light deflecting surface 142 is positioned such that light reflecting or deflecting off of the second light deflecting surface 142 is primarily emitted in the second portion $P_2$ of the gap G, as is also shown in FIG. 4

Each of the first lighting member 128 and the second lighting member 130 can include any of a variety of lighting devices and device configurations. For example, the first lighting member 128 and the second lighting member 130 can be light pipes that emit light along their length when illuminated from one end thereof by, for example, an LED (light emitting diode). Since light pipes and LEDs are conventional lighting members, further description is omitted for the sake of brevity. Alternatively, each of the first lighting member 128 and the second lighting member 130 can include conventional lighting elements such as a series of small incandescent bulbs, or a linear series of LEDs. Further, the first lighting member 128 and the second lighting member 130 can alternatively be reflective elements, such as parabolic mirrors, or other similar constructs that receive light from a remote lighting element or elements and reflect, radiate, disperse or otherwise emit that light outward and away from itself through the first and second areas $A_4$ and $A_5$ of the transparent surface 14b.

A detailed description of alternative examples of the design and function of the inner components of each of the first lamp assembly 12 and the second lamp assembly 14 can be found in co-pending and commonly assigned U.S. patent application Ser. No. 14/612,565, filed Feb. 3, 2015, and U.S. patent application Ser. No. 15/074,401, filed Mar. 18, 2016, (both assigned to Nissan North America, Inc.). U.S. patent application Ser. Nos. 14/612,565 and 15/074,401 are incorporated herein by reference in their entirety.

The configuration of the vehicle body structure 26, the movable body panel 18 (the closure member), in combination with the first lamp assembly 12 and the second lamp assembly 14 is such that with the movable body panel 18 in the closed position (FIGS. 1 and 3-5), the first lamp assembly 12 and the second lamp assembly 14 are aligned. More specifically, The location of the first light passage 28a and the end 28e of the first lighting member 28 are predetermined such that with the movable body panel 18 in the closed position the first light passage 28a focuses or otherwise allows light emitted from the end 28e of the first lighting member 28 to shine directly on the first light deflecting surface 140. Similarly, the location of the second light passage 30a and the end 30e of the second lighting member 30 are predetermined such that with the movable body panel 18 in the closed position the second light passage 30a focuses or otherwise allows light emitted from the end 30e of the second lighting member 30 to shine directly on the second light deflecting surface 142.

As mentioned above, the first lighting member 28 and the second lighting member 30 can include any of a variety of lighting sources (LED, incandescent bulb, or other lighting device). The end 28a of the first lighting member 28 can include a lens, or can be the end of a light diffusing member that emits light. Similarly, end 30a of the second lighting member 30 can include a lens, or can be the end of a light diffusing member that emits light.

Hence, when the movable body panel 18 is in the closed position, light $L_1$ of the first lighting member 28 is directed through the end 28e of the first lighting member 28 as light $L_2$ through the first light passage 28a to the first light deflecting surface 140, as shown in FIG. 5. The light $L_2$ is reflected or deflected off of the first light deflecting surface 140 as light $L_3$ filling the first portion $P_1$ of the gap G with light, as indicated in FIG. 4. Similarly, when the movable body panel 18 is in the closed position, light $L_1$ of the second lighting member 30 is directed through the end 30e of the second lighting member 30 as light $L_2$ through the second light passage 30a to the second light deflecting surface 142, as shown in FIG. 5. The light $L_2$ is reflected or deflected off of the second light deflecting surface 142 as light $L_3$ filling the second portion $P_2$ of the gap G with light, as indicated in FIG. 4.

The overall effect of the light reflected, diffused and/or deflected off of the light deflecting surfaces 140 and 142 is such that the first lamp assembly 12 and the second lamp assembly 14 have the appearance of being one single lamp assembly, as shown in FIG. 4. Specifically, when operating: the first lighting member 28 illuminates the area $A_1$ of the transparent surface 12b of the transparent lens cover 32 of the first lamp assembly 12; light from the light deflecting surface 140 fills the first portion $P_1$ of the gap G; and the first lighting member 128 illuminates the area $A_4$ of the transparent surface 14b of the transparent lens cover 132 of the second lamp assembly 14. Similarly, the second lighting member 30 illuminates the area $A_s$ of the transparent surface 12b of the transparent lens cover 32 of the first lamp assembly 12; light from the light deflecting surface 142 fills the second portion $P_2$ of the gap G; and the second lighting member 130 illuminates the area $A_4$ of the transparent surface 14b of the transparent lens cover 132 of the second lamp assembly 14. Hence, two unbroken areas of light are emitted from each side of the rear of the vehicle 10, thereby disguising or hiding the gap G between the first lamp assembly 12 and the second lamp assembly 14.

It should be understood from the drawings and the description herein, that it is not necessary for the first lighting member 28, the first lighting passage 28a and the first light deflecting surface 140 to be perfectly aligned with one another in order for the first area $P_1$ to be illuminated by the light $L_3$. Rather, as long as at least a portion of the light $L_2$ is directly aimed at the first light deflecting surface 140, the first area $P_1$ is provided with illumination. Similarly, it is not necessary for the second lighting member 30, the second lighting passage 30a and the second light deflecting surface 142 to be perfectly aligned with one another in order for the second area $P_2$ to be illuminated by the light $L_3$. Rather, as long as at least a portion of the light $L_2$ is directly aimed at the second light deflecting surface 142, the second area $P_2$ is provided with illumination.

Figure 10:
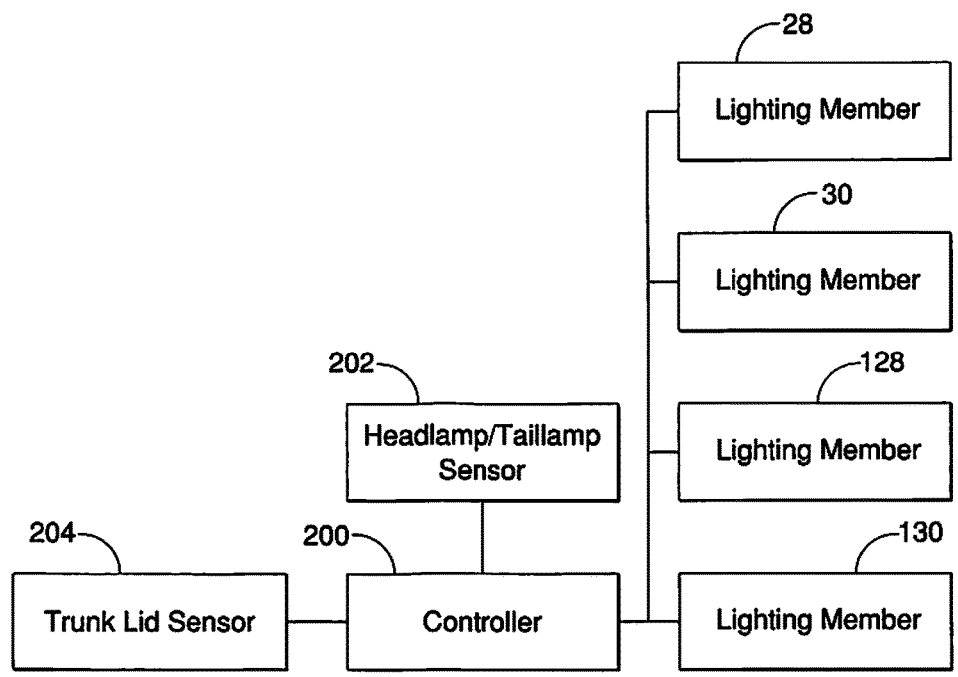
FIG. 10 is a block diagram of a control system operable to operate the first and second lighting members of the first lamp assembly in response to movement of the closure member in accordance with the first embodiment.
Figure 11:
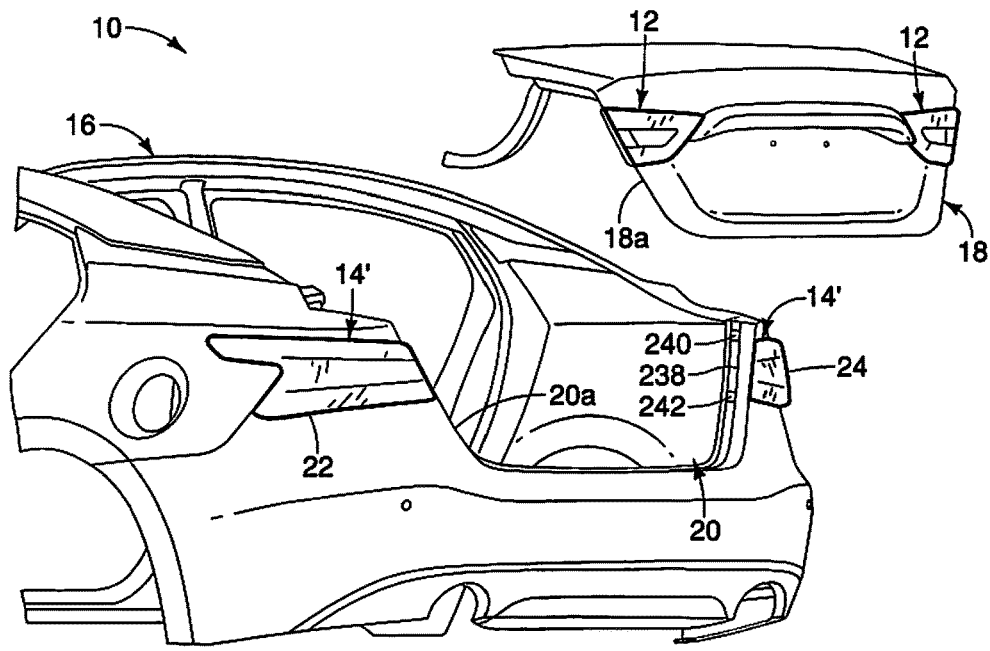
FIG. 11 is an exploded perspective view of a vehicle body structure showing an opening, a closure member, a first lamp assembly and a second lamp assembly in accordance with a second embodiment.
Figure 12:
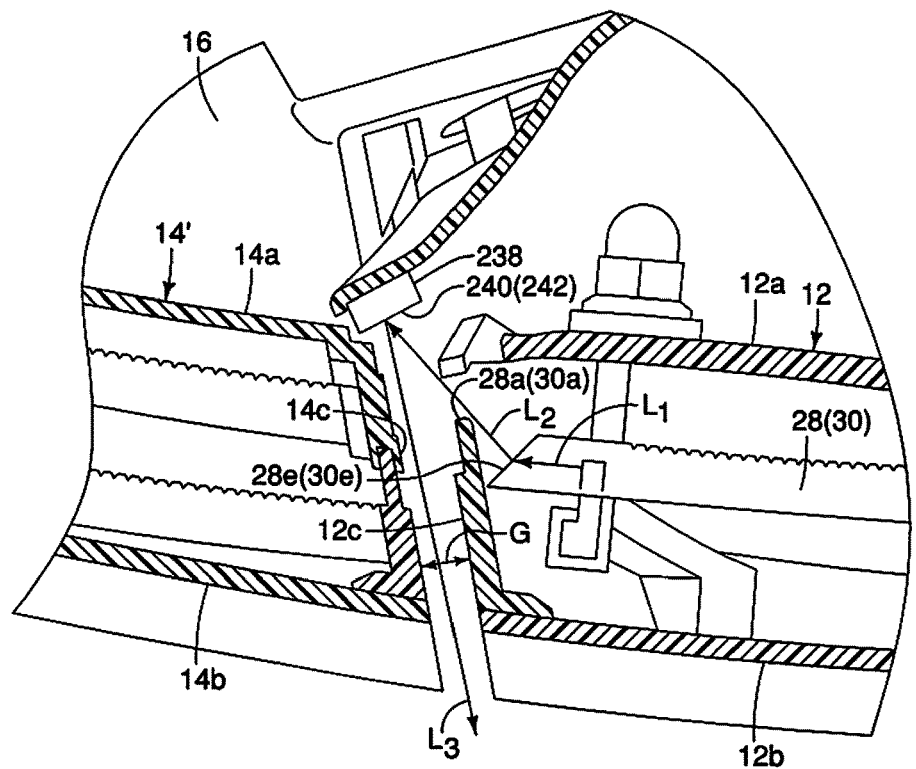
FIG. 12 is a cross-section schematic view of the vehicle lighting structure shown in FIG. 11 (similar to the cross-section shown in FIG. 4), showing the first lighting member of the first lamp assembly emitting light through a light passage of the first lamp assembly on to a light deflecting surface of the vehicle body structure in order illuminate a portion of the gap defined between the first lamp assembly and the second lamp assembly in accordance with the second embodiment.

As shown in FIG. 10, the vehicle 10 includes a controller 200, a headlamp/tail lamp sensor 202 and a trunk lid sensor 204. The vehicle body structure 16 is provided with the trunk lid sensor 204 such that the trunk lid sensor 204 senses whether or not the movable body panel 18 (a closure member) is in the open position or the closed position. The headlamp/tail lamp sensor 202 is connected to an instrument panel of the vehicle and senses whether or not the lights of the vehicle 10 (headlamps or parking lights) are on or off. The controller 200 is connected to each of the headlamp/tail lamp sensor 202, a trunk lid sensor 204, the first lighting member 28 and the second lighting member 30 of the first lamp assembly 12, and the first lighting member 128 and the second lighting member 130 of the second lamp assembly 14.

When the vehicle operator turns the headlamps, brake lights or parking lamps on, the controller 200 receives signals from the headlamp/tail lamp sensor 202 indicating this status. The controller 200 similarly receives signals from the trunk lid sensor 204.

The controller 200 is configured to permit operation of the first and second lighting member 28 and 30 of the first lamp assembly 12 only when the movable body panel 18 is the closed position shown in FIG. 1 and when the vehicle lights have been turned on. Specifically, the controller 200 monitors signals from the Headlamp/Tail Lamp sensor 202 and the trunk lid sensor 204. When the headlamp/tail lamp sensor 202 indicates that one or more of the headlamps, brake lights or parking lamps on and the trunk lid sensor 204 provides a signal indicating that the movable body panel 18 is in the closed position, the controller 200 enables operation of the first and second lighting member 28 and 30 of the first lamp assembly 12. However, if the trunk lid sensor 204 provides a signal indicating that the movable body panel 18 is no longer in the closed position, the controller 200 ceases operation of the first and second lighting member 28 and 30 of the first lamp assembly 12.

Second Embodiment

Referring now to FIG. 14, the first lamp assembly 12 and a second lamp assembly 14' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the second embodiment, the first lamp assembly 12 is as described above with respect to the first embodiment, and includes all of the features of the first lamp assembly 12 of the first embodiment. The second lamp assembly 14' includes all of the features of the first lamp assembly 14 of the first embodiment except that a rear corner 14d' of the second lamp assembly 14' does not include the projection 138.

Instead, a portion of the vehicle body structure 16 includes a projection 238. The projection 238 includes a first light deflecting surface 240 and a second light deflecting surface 242. With the closure member 18 in the closed position (FIG. 1) light from the first lamp assembly 12 aimed at each of the first light deflecting surface 240 and the second light deflecting surface 242 provides the same effect as described above with respect to light from the first light deflecting surface 140 and a second light deflecting surface 142, thereby illuminating the first portion $P_1$ and the second portion $P_2$ of the gap G.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle lighting structure. Accordingly, these terms, as utilized to describe the present invention should be interpreted relative to a vehicle equipped with the vehicle lighting structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature. Thus, the foregoing descriptions of the embodiments according to the present invention are provided for illustration only, and not for the purpose of limiting the invention as defined by the appended claims and their equivalents.

What is claimed is:

1. A vehicle lighting structure comprising:
a first lamp assembly having a first attachment surface, a first transparent surface opposite the first attachment surface, a first side surface extending from the first transparent surface to the first attachment surface, and a first lighting member positioned to emit light through a portion of the first side surface and the first transparent surface; and
a second lamp assembly having a second attachment surface, a second transparent surface opposite the second attachment surface and a second side surface extending from the second transparent surface to the second attachment surface, the second side surface having a first projection extending therefrom that defines a first light deflecting surface such that when the second side surface and the first side surface are adjacent to one another with the light deflecting surface and first lighting member being aligned, and with the first lighting member providing light, the first light deflecting surface reflects light from the first lighting member and disperses the light from the first lighting member in a first area between the first lamp assembly and the second lamp assembly.

2. The vehicle lighting structure according to claim 1, wherein
the first lamp assembly includes an additional lighting member, and
the second side surface of the second lamp assembly has a second projection extending from an area spaced apart from the first projection, the second projection defines a second light deflecting surface such that when the second side surface and the first side surface are adjacent to one another with the additional lighting member and the second light deflecting surface being aligned, and with the additional lighting member providing light, the light deflecting surface reflects light from the additional lighting member and disperses light from the additional lighting member in a second area between the first lamp assembly and the second lamp assembly spaced apart from the first area.

3. The vehicle lighting structure according to claim 2, wherein
the portion of the first side surface defines a first light passage with the first lighting member being aimed to direct light out of the first light passage to the first light deflecting surface.

4. The vehicle lighting structure according to claim 3, wherein
the first side surface defines a second light passage with the additional lighting member being aimed to direct light out of the second light passage to the second light deflecting surface.

5. The vehicle lighting structure according to claim 3, wherein
the first light passage includes an optical lens configured to focus light from the first lighting member at the first light deflecting surface.

6. The vehicle lighting structure according to claim 1, wherein
the second lamp assembly includes a second lighting member positioned to emit light through the second transparent surface.

7. The vehicle lighting structure according to claim 6, wherein
the first lamp assembly includes a third lighting member positioned to emit light through the first transparent surface.

8. The vehicle lighting structure according to claim 1, wherein
the first lighting member is an LED.

9. A vehicle lighting structure comprising:
a vehicle body structure having an outer body surface surrounding an opening;
a closure member pivotally supported to the vehicle body structure and movable between a closed orientation covering the opening and an open orientation exposing the opening;

a first lamp assembly having a first attachment surface attached to the closure member for movement therewith, a transparent surface opposite the attachment surface, and a side surface extending from the transparent surface to the attachment surface, and a first lighting member positioned to emit light through a portion of the first side surface and the transparent surface;

a second lamp assembly having an attachment surface attached to the vehicle body structure adjacent to the opening, a transparent surface opposite the attachment surface and a side surface extending from the transparent surface to the attachment surface; and a projection extending from one of the side surface of the second lamp assembly and the outer body surface adjacent to the opening, the projection defining a first light deflecting surface such that with the closure member in the closed orientation and the side surface of the first lamp assembly and the side surface of the second lamp assembly are adjacent to one another, the light deflecting surface and first lighting member being aligned, and with the first lighting member providing light, the first light deflecting surface reflects light from the first lighting member and disperses the light from the first lighting member in a first area defined between the first lamp assembly and the second lamp assembly.

10. The vehicle lighting structure according to claim 9, wherein
the projection extends from the outer body surface adjacent to the opening.

11. The vehicle lighting structure according to claim 9, wherein
the projection is integrally formed with the second lamp assembly and extends from the side surface of the second lamp assembly.

12. The vehicle lighting structure according to claim 9, wherein
the first lamp assembly includes an additional lighting member, and
the projection defines a second light deflecting surface such that when the second side surface and the first side surface are adjacent to one another with the additional lighting member the second light deflecting surface being aligned, and with the additional lighting member providing light, the light deflecting surface reflects and disperses light in a second area spaced apart from the first area defined between the first lamp assembly and the second lamp assembly.

13. The vehicle lighting structure according to claim 9, wherein
the second lamp assembly includes a second lighting member positioned to emit light to the second transparent surface.

14. The vehicle lighting structure according to claim 13, wherein
the first lamp assembly includes a third lighting member positioned to emit light to the first transparent surface.

15. The vehicle lighting structure according to claim 9, wherein
the first lighting member is an LED.

16. The vehicle lighting structure according to claim 9, wherein
the first lamp assembly defines a first upper edge and the second lamp assembly defines a second upper edge that is aligned with the first upper edge with the closure member in the closed orientation.

17. The vehicle lighting structure according to claim 9, further comprising:
a closure member sensor within the vehicle body structure that detects orientation of the closure member; and
a controller connected to the closure member sensor and the first lighting member, the controller being configured to operate the first lighting member in response to determining that the closure member is in the closed orientation and cease operating the first lighting member in response to determining that the closure member is in the open orientation.

18. A vehicle lighting structure comprising:
a vehicle body structure having an outer body surface;
a first lamp assembly having a first attachment surface coupled to the vehicle body structure, a transparent surface opposite the attachment surface, and a side surface extending from the transparent surface to the attachment surface, and a first lighting member positioned to emit light through a portion of the first side surface and the transparent surface;
a projection coupled to the outer body surface and defining a light deflecting surface such that with the side surface of the first lamp assembly positioned adjacent to the projection, with the light deflecting surface and first lighting member aligned and with the first lighting member providing light, the first light deflecting surface reflects light from the first lighting member and disperses the light from the first lighting member in an area defined adjacent to the first lamp assembly along and adjacent to the transparent surface.

19. The vehicle lighting structure according to claim 18, wherein
the outer body surface of the vehicle body structure defines and surrounds an opening,
the vehicle body structure includes a closure member pivotally supported to the vehicle body structure and movable between a closed orientation covering the opening and an open orientation exposing the opening,
the first attachment surface of the first lamp assembly is attached to the closure member for movement therewith, and
the projection is non-movably attached to the outer body surface adjacent to the opening.

20. The vehicle lighting structure according to claim 19 further comprising:
a second lamp assembly has an attachment surface attached to the vehicle body structure adjacent to the opening, a transparent surface opposite the attachment surface and a side surface extending from the transparent surface to the attachment surface, and
the projection extends from one of the side surface of the second lamp assembly and the outer body surface adjacent to the opening, and
the area defined adjacent to the first lamp assembly is further defined between the first lamp assembly and the second lamp assembly with the closure member in the closed orientation.

* * * * *